United States Patent
Li et al.

(10) Patent No.: US 10,253,232 B2
(45) Date of Patent: Apr. 9, 2019

(54) METHOD OF LUBRICATING A ROTARY SCREW COMPRESSOR

(71) Applicant: Patech Fine Chemicals Co., Ltd., Changhua County (TW)

(72) Inventors: Hsinheng Li, The Woodlands, TX (US); Jeng-Shiang Tsaih, Changhua County (TW); Hsu-Hua Tang, Changhua County (TW); Jung-Tsung Hung, Changhua County (TW); Chih-Wei Wu, Changhua County (TW); Tai-Her Tsai, Changhua County (TW); Hsin-Li Huang, Changhua County (TW)

(73) Assignee: PATECH FINE CHEMICALS CO., LTD., Changhua County (TW)

( * ) Notice: Subject to any disclaimer, the term of this patent is extended or adjusted under 35 U.S.C. 154(b) by 248 days.

(21) Appl. No.: 14/618,129

(22) Filed: Feb. 10, 2015

(65) Prior Publication Data
US 2016/0230111 A1    Aug. 11, 2016

(51) Int. Cl.
*C09K 5/04* (2006.01)
*C10M 111/02* (2006.01)
*C10M 169/04* (2006.01)
*C10M 171/00* (2006.01)

(52) U.S. Cl.
CPC .......... *C09K 5/045* (2013.01); *C10M 111/02* (2013.01); *C10M 169/04* (2013.01); *C10M 171/008* (2013.01); C09K 2205/24 (2013.01); C10M 2207/283 (2013.01); C10M 2207/2835 (2013.01); C10M 2211/063 (2013.01); C10N 2220/021 (2013.01); C10N 2220/027 (2013.01); C10N 2220/028 (2013.01); C10N 2220/302 (2013.01); C10N 2230/02 (2013.01); C10N 2230/10 (2013.01); C10N 2230/26 (2013.01); *C10N 2230/41* (2013.01); *C10N 2230/66* (2013.01); *C10N 2230/70* (2013.01); *C10N 2240/30* (2013.01)

(58) Field of Classification Search
CPC ...................................... C09K 5/045
USPC ........................................... 252/68
See application file for complete search history.

(56) References Cited

U.S. PATENT DOCUMENTS

| | | | | |
|---|---|---|---|---|
| 5,498,356 | A * | 3/1996 | Kamakura | C10M 133/22 252/68 |
| 6,267,907 | B1 * | 7/2001 | Tolfa | C09K 5/041 252/68 |
| 2011/0240910 | A1 | 10/2011 | Carr et al. | |
| 2013/0200295 | A1 * | 8/2013 | Rebrovic | C09K 5/045 252/68 |
| 2013/0207022 | A1 * | 8/2013 | Hessell | C09K 5/045 252/68 |

FOREIGN PATENT DOCUMENTS

| | | |
|---|---|---|
| EP | 1281701 A1 | 2/2003 |
| JP | 5466772 B2 | 4/2014 |

OTHER PUBLICATIONS

European Search Report in corresponding European Application No. 15154625 dated May 15, 2015.

* cited by examiner

*Primary Examiner* — Vasudevan S Jagannathan
*Assistant Examiner* — Preeti Kumar
(74) *Attorney, Agent, or Firm* — Bacon & Thomas, PLLC

(57) ABSTRACT

An ester-based lubricating oil for use in a rotary screw compressor utilizing a chlorine-free hydrofluorocarbon (HFC) refrigerant such as R-134a contains a product obtained from a reaction of tripentaerythritol and a mixed C5-C10 monocarboxylic acid, or a product obtained from a reaction of dipentaerythritol and a mixed C5-C10 monocarboxylic acid, and optionally a product obtained from a reaction of dipentaerythritol and a C5 monocarboxylic acid.

19 Claims, No Drawings

METHOD OF LUBRICATING A ROTARY SCREW COMPRESSOR

FIELD OF THE INVENTION

The present invention mainly relates to an ester-based lubricating oil, in particular, and to a lubricating oil for use in a rotary screw compressor utilizing a chlorine-free hydrofluorocarbon (HFC) as the refrigerant.

BACKGROUND OF THE INVENTION

Heating, refrigeration or air-conditioning systems that typically employ rotary screw compressors are commonly found in office buildings, hotels, shopping malls, food storage and processing facilities, chemical processing, a wide variety of manufacturing plants, etc. Keeping the operating cost low is a key job of building owners as well as manufacturing plant managers. In this regard, the ability to keep heating and cooling cost low is critical; ASHRAE (American Society of Heating, Refrigeration and Air-Conditioning Engineers) estimates that 50% of building energy consumption is due to heating or cooling. In addition, there are important positive environmental and social impacts if energy efficiency can be improved.

The rotary screw compressor is a type of positive displacement compression machine. The key parts of the conventional rotary screw compressor are composed of two meshing, parallel and helical-profiled rotors housed in a casing. The movement and design of the rotors allow gas to be drawn into, sealed off and compressed as the gas is transported from the suction port to the discharge port thereof. In the design of oil-filled rotary screw compression machines, a lubricating oil bridges the gap between the rotors therefore providing a hydraulic seal and transferring mechanical energy between the driving and driven rotors.

The basic requirements of rotary screw compressors are robustness and reliability as they are expected to have a life expectancy of years or even decades while operating continuously with little maintenance work. The robustness and energy efficiency of rotary screw compressors have been achieved and are continually pursued by mechanical engineers in precise fitting and tight clearances between the helical rotors, and between the rotors and the chamber for better sealing of the compression cavities; and in precise assembly with the help of adoptions of advanced material and ever progressing modern digital controllers with intelligent algorithm. However, lubricant can be a relatively cost effective way to achieve higher efficiency. An optimal outcome would be a lubricating oil that improves both the efficiency and reliability of a compressor.

Evaporator is a critical component in refrigeration or air-conditioning systems; it is in the evaporator that the actual cooling or heat transfer takes place. The evaporators are a type of heat exchangers that transfer heat between substances, which in the case of air-conditioners between refrigerant and air, to be cooled by the refrigerant. A common necessity of evaporators is that heat transfer surfaces, whether inside or outside the evaporators, need to be kept clean in order not to impede the heat transfer through conduction. For example, defrosting is commonly deployed for this purpose. The impact of a lubricating oil on heat transfer arises from the fact that lubricating oil is pumped out of the discharge port along with the discharged gas. Many refrigeration systems or machines typically have oil separators built in downstream from the discharge port, but these oil separators can't capture all lubricating oil molecules. It is inevitable that some lubricating oil would pass through the separator. The passing lubricating oil needs to be drawn back to the compressor; otherwise any accumulation of lubricating oil in areas outside the compressors may cause oil starvation inside the compressor and/or hinder system functionality such as heat transfer in the evaporator of the refrigeration or air-conditioning system. Lubricating oils which are designed to be compatible/miscible with the refrigerant, allowing it to circulate back to the compressor along with the refrigerant, and having little tendency of accumulation on evaporator surfaces, are highly desired.

There are contradicting requirements of lubricating oil which is capable of providing better hydraulic sealing while in possession of excellent compatibility/miscibility with refrigerants, for example, while high viscosity lubricating oil typically provides more effective hydraulic sealing and wear protection, it tends not to have adequate compatibility or miscibility with the refrigerant especially at low temperatures. A serious, adverse implication of this inadequate compatibility/miscibility is poor oil return and reduced heat transfer in the low temperature evaporator/heat exchanger area.

The challenges in the development of high viscosity, performance-improving lubricating oil is further complicated by the adoption of non-ozone depleting environmentally friendly hydrofluorocarbon (HFC) refrigerants. The conventional chororflorocarbon (CFC) or hydrochorofluorocarbon (HCFC) refrigerants, owning to the presence of chlorine atom are inherently slightly polar therefore generally are better solvents. The hydrofluorocarbon (HFC) refrigerants, having no chlorine atom, are inferior solvents thus making finding compatible/miscible lubricating oil difficult, for those of high viscosity, even more harder.

In addition to finding lubricating oil that is capable of providing better hydraulic sealing, wear protection as well as superior compatibility/miscibility in order to enhance compressor system efficiency, it is essential that these innovative lubricating oils are to preserved those properties typically possessed by the conventional refrigeration machine lubricating oils such as adequate hydrodynamic lubricating film thickness, high dielectric strength, superior hydrolytic stability, good thermal stability, high flash point, low pour point, and high viscosity index (VI), etc.

SUMMARY OF THE INVENTION

A primary objective of the present invention is to provide a method of lubricating a rotary screw compressor, in which a chlorine-free hydrofluorocarbon refrigerant is compressed, which comprises mixing a lubricant composition of the present invention with the chlorine-free hydrofluorocarbon refrigerant.

Another objective of the present invention is to provide a lubricant composition and a refrigerant working fluid for enhancing performance of a rotary screw compressor, wherein the refrigerant working fluid comprises the lubricant composition of the present invention and a chlorine-free hydrofluorocarbon refrigerant.

Still another objective of the present invention is to provide a rotary screw compressor comprising the refrigerant working fluid of the present invention.

A further objective of the present invention is to provide a refrigerating apparatus, or a heat pump system or Air-Conditioner comprising the rotary screw compressor of the present invention.

In order to accomplish the aforesaid objectives a lubricant composition provided in accordance with the present invention comprises a mixed polyester having a formula of (I) or (II):

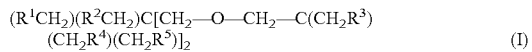

wherein each of $R^1$ to $R^8$ is a carboxylate of a C5-C10 monocarboxylic acid, and the mixed polyester has two or more different carboxylates of the C5-C10 monocarboxylic acids.

Preferable embodiments of the present invention includes (but not limited to) the following items:

1. A method of lubricating a rotary screw compressor in which a chlorine-free hydrofluorocarbon refrigerant is compressed, which comprises mixing a lubricant composition with said chlorine-free hydrofluorocarbon refrigerant, wherein said lubricant composition comprising a mixed polyester having a formula of (I) or (II):

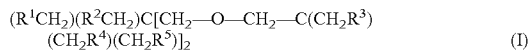

wherein each of $R^1$ to $R^8$ is a carboxylate of a C5-C10 monocarboxylic acid, and the mixed polyester has two or more different carboxylates of the C5-C10 monocarboxylic acids.

2. The method of Item 1, wherein the mixed polyester has the formula (I), and the C5-C10 monocarboxylic acid comprises C5 carboxylic acid, and C9 carboxylic acid or C10 carboxylic acid, wherein the carboxylates of $R^1$ to $R^5$ have a ratio between weight of the C5 carboxylic acid and a total weight of the C9 carboxylic acid and C10 carboxylic acid being 6:1 to 1:4.

3. The method of Item 2, wherein the C5 carboxylic acid comprises n-pentanoic acid or methylbutanoic acid, the C9 carboxylic acid comprises 3,5,5-trimethyl hexanoic acid, and the C10 carboxylic acid comprises neodecanoic acid.

4. The method of Item 3, wherein the mixed polyester has a weight ratio of the carboxylates of n-pentanoic acid, methylbutanoic acid and 3,5,5-trimethyl hexanoic acid being about 1-3:6-8:2.

5. The method of Item 4, wherein the weight ratio of the carboxylates of n-pentanoic acid, methylbutanoic acid and 3,5,5-trimethyl hexanoic acid is about 2:7:2.

6. The method of Item 4, wherein the mixed polyester is a product mixture obtained from a reaction of tripentaerythritol and a mixed carboxylic acid of n-pentanoic acid, methylbutanoic acid and 3,5,5-trimethyl hexanoic acid, or reactions of tripentaerythritol and one, two or three carboxylic acids selected from n-pentanoic acid, methylbutanoic acid and 3,5,5-trimethyl hexanoic acid, with a molar ratio of hydroxyl group to carboxyl group of about 1.0:1.02-1.2.

7. The method of Item 6, wherein the mixed polyester is a product mixture obtained from a reaction of tripentaerythritol and a mixed carboxylic acid of n-pentanoic acid, methylbutanoic acid and 3,5,5-trimethyl hexanoic acid.

8. The method of Item 1, wherein said lubricant composition comprises the mixed polyester having the formula (I) and the mixed polyester having the formula (II), wherein each of $R^6$ to $R^8$ is a carboxylate of a C5 monocarboxylic acid, and a weight ratio between the mixed polyester having the formula (I) and the mixed polyester having the formula (II) is 7:3 to 1:2.

9. The method of Item 8, wherein $R^6$, $R^7$ and $R^8$ are carboxylates of methylbutanoic acid.

10. The method of Item 9, wherein the C5-C10 monocarboxylic acid comprises C5 carboxylic acid, and C9 carboxylic acid or C10 carboxylic acid, wherein the carboxylates of $R^1$ to $R^5$ have a ratio between weight of the C5 carboxylic acid and a total weight of the C9 carboxylic acid and C10 carboxylic acid being 6:1 to 1:4.

11. The method of Item 9, wherein the C5-C10 monocarboxylic acid comprises methylbutanoic acid and 3,5,5-trimethyl hexanoic acid, wherein a ratio between weight of 3-methylbutanoic acid and weight of 3,5,5-trimethyl hexanoic acid is about 3:7.

12. The method of Item 9, wherein the C5-C10 monocarboxylic acid comprises methylbutanoic acid and neodecanoic acid, wherein a ratio between weight of methylbutanoic acid and weight of neodecanoic acid is about 1:3.

13. The method of Item 11, wherein the weight ratio between the mixed polyester having the formula (I) and the mixed polyester having the formula (II) is about 1:1.

14. The method of Item 12, wherein the weight ratio between the mixed polyester having the formula (I) and the mixed polyester having the formula (II) is about 55:45.

15. The method of Item 1, wherein the mixed polyester has the formula (II), and the C5-C10 monocarboxylic acid comprises C5 carboxylic acid, and C9 carboxylic acid, wherein the carboxylates of $R^6$ to $R^8$ have a ratio between weight of the C5 carboxylic acid and the C9 carboxylic acid being 5:1 to 1:4.

16. The method of Item 15, wherein the C5 carboxylic acid comprises methylbutanoic acid, and the C9 carboxylic acid comprises 3,5,5-trimethyl hexanoic acid.

17. The method of Item 16, wherein a weight ratio of the carboxylates of methylbutanoic acid and 3,5,5-trimethyl hexanoic acid is about 2:1 to 1:2.

18. The method of Item 17, wherein the weight ratio of the carboxylates of methylbutanoic acid and 3,5,5-trimethyl hexanoic acid is about 1:1.

19. The method of Item 16, wherein the mixed polyester having the formula (II) is a product mixture obtained from a reaction of dipentaerythritol and a mixed carboxylic acid of methylbutanoic acid and 3,5,5-trimethyl hexanoic acid with a molar ratio of hydroxyl group to carboxyl group of about 1.0:1.05-1.2.

20. The method of Item 1, wherein said lubricant composition has a viscosity of 160-460 centistokes at 40° C.

21. The method of Item 20, wherein said lubricant composition has a viscosity of 220-360 centistokes at 40° C.

22. The method of Item 20, wherein said lubricant composition has a miscibility with the chlorine-free hydrofluorocarbon refrigerant lower than −35° C. at 5 wt %, 10 wt % and 20 wt % said lubricant composition in said chlorine-free hydrofluorocarbon refrigerant, based on total weight of said lubricant composition and said chlorine-free hydrofluorocarbon refrigerant, when said chlorine-free hydrofluorocarbon refrigerant is R-134a.

23. The method of Item 22, wherein said miscibility is lower than −45° C.

24. The method of Item 23, wherein said miscibility is lower than −60° C.

25. The method of Item 1, wherein another lubricant or base stock composition is blended with said lubricant composition at a ratio of less than 20%, based on the weight of said lubricant composition.

26. The method of Item 1, wherein one or more additives selected from the group consisting of an oxidation resistance and thermal stability improver, corrosion inhibitor, metal deactivator, lubricity additive, viscosity index improver, pour and/or floc point depressant, detergent, dispersant, anti-foaming agent, acid scavenger, anti-wear agent and extreme pressure resistance agent is mixed with said lubricant composition, said chlorine-free hydrofluorocarbon or the mixture said lubricant composition and said chlorine-free hydrofluorocarbon in an amount of 3% or less than 3%, based on a weight of said mixture.

27. The method of Item 1, wherein the chlorine-free hydrofluorocarbon refrigerant is R-134a, R-32, R-125 or a mixture thereof.

DETAILED DESCRIPTION OF THE INVENTION

The present invention discloses an ester-based lubricating oil and a refrigerant working fluid containing the ester-based lubricating oil and a chlorine-free hydrofluorocarbon refrigerant for a rotary screw compressor. The working fluid of the present invention is capable of improving the performance/efficiency of the rotary screw compressor, which in turn improves the performance/efficiency of a refrigerating apparatus, a heat pump system or air-conditioner containing the rotary screw compressor.

The ester-based synthetic lubricating oil comprises esterification products of dipentaerythritol (DiPE), tripentaerythritol (TriPE) or mixtures thereof and a mixed monocarboxylic acid having chain length of five to ten carbons in the presence or absence of a catalyst followed by purification. To improve the efficiency or yield of the chemical synthesis, an excessive amount of acids is used to reacted with polyol or polyols. A typical reaction temperature ranges from 150 to 250° C. (preferably 180 to 240° C., and more preferably 200 to 230° C.), and a typical reaction time ranges from 6 hours to 18 hours (preferably 8 hours to 14 hours, and more preferably 8 hours to 12 hours). A typical catalyst can be used in the esterification includes (but not limited to) stannous oxalate, stannous oxide, tetra-n-butyltitanate, tetraisopropyl titanate, and methanesulfonic acid. The esterification product typically has a hydroxyl value of below 10 mgKOH/g (preferably below 5 mgKOH/g, and more preferably below 3 mgKOH/g). The purification process typically involves removing of water by vacuum, removing of acids by neutralization with NaOH and discoloration by carbon black. The final purified polyester product has a total acid number (TAN) less than 0.1 mgKOH/g and a water content less than 50 ppm. The low water content is achieved with the help of bubbling dry nitrogen through the purified polyester product.

The DiPE, and TriPE can be pure or can have certain amounts of polyols that are commonly found in the commercially available DiPE or TriPE. The monocarboxylic acid, especially the C5 monocarboxylic acid and C9 monocarboxylic acid can be linear or branched. Preferably, the C5 monocarboxylic acid includes (but not limited to) 2-methylbutanoic acid, 3-methylbutanoic acid, and a mixture thereof; and the C9 monocarboxylic acid preferably is 3,5,5-trimethyl hexanoic acid.

Under some conditions of use, the ester(s) as described herein will function satisfactorily as complete lubricants. It is generally preferable, however, for a complete lubricant to contain other materials generally denoted in the art as additives, such as oxidation resistance and thermal stability improvers, corrosion inhibitors, metal deactivators, lubricity additives, viscosity index improvers, pour and/or floc point depressants, detergents, antifoaming agents, acid scavengers, anti-wear agents, and extreme pressure resistant additives. Many additives are multi-functional. For example, certain additives may impart both anti-wear and extreme pressure resistance properties, or function both as a metal deactivator and a corrosion inhibitor. Cumulatively, all additives preferably do not exceed 8% by weight, or more preferably do not exceed 5% by weight, of the total compounded lubricant formulation.

An effective amount of the foregoing additive types is generally in the range from 0.01 to 5% for the antioxidant component, 0.01 to 5% for the corrosion inhibitor component, from 0.001 to 0.5% for the metal deactivator component, from 0.5 to 5% for the lubricity additives, from 0.01 to 2% for each of the acid scavengers, viscosity index improvers, and pour and/or floc point depressants, from 0.1 to 5% for each of the detergents and dispersants, from 0.001 to 0.1% for anti-foam agents, and from 0.1-2% for each of the anti-wear and extreme pressure resistance components. All these percentages are by weight and are based on the total lubricant composition. It is to be understood that more or less than the stated amounts of additives may be more suitable to particular circumstances, and that a single molecular type or a mixture of types may be used for each type of additive component. Also, the examples listed below are intended to be merely illustrative and not limiting, except as described in the appended claims.

Examples of suitable oxidation resistance and thermal stability improvers are diphenyl-, dinaphthyl-, and phenyl-naphthyl-amines, in which the phenyl and naphthyl groups can be substituted, e.g., N,N'-diphenyl phenylenediamine, p-octyldiphenylamine, p,p-dioctyldiphenylamine, N-phenyl-1-naphthyl amine, N-phenyl-2-naphthyl amine, N-(p-dodecyl)phenyl-2-naphthyl amine, di-1-naphthylamine, and di-2-naphthylamine; phenothiazines such as N-alkylphenothiazines; imino(bisbenzyl); and hindered phenols such as 6-(t-butyl) phenol, 2,6-di-(t-butyl) phenol, 4-methyl-2,6-di-(t-butyl) phenol, 4,4'-methylenebis(−2,6-di-{t-butyl}phenol), and the like.

Examples of suitable cuprous metal deactivators are imidazole, benzamidazole, 2-mercaptobenzthiazole, 2,5-dimercaptothiadiazole, salicylidine-propylenediamine, pyrazole, benzotriazole, tolutriazole, 2-methylbenzamidazole, 3,5-dimethyl pyrazole, and methylene bis-benzotriazole. Benzotriazole derivatives are preferred. Other examples of more general metal deactivators and/or corrosion inhibitors include organic acids and their esters, metal salts, and anhydrides, e.g., N-oleyl-sarcosine, sorbitan monooleate, lead naphthenate, dodecenyl-succinic acid and its partial esters and amides, and 4-nonylphenoxy acetic acid; primary, secondary, and tertiary aliphatic and cycloaliphatic amines and amine salts of organic and inorganic acids, e.g., oil-soluble alkylammonium carboxylates; heterocyclic nitrogen containing compounds, e.g., thiadiazoles, substituted imidazolines, and oxazolines; quinolines, quinones, and anthraquinones; propyl gallate; barium dinonyl naphthalene sulfonate; ester and amide derivatives of alkenyl succinic anhydrides or acids, dithiocarbamates, dithiophosphates; amine salts of alkyl acid phosphates and their derivatives.

Examples of suitable lubricity additives include long chain derivatives of fatty acids and natural oils, such as esters, amines, amides, imidazolines, and borates.

Examples of suitable viscosity index improvers include polymethacrylates, copolymers of vinyl pyrrolidone and methacrylates, polybutenes, and styrene-acrylate copolymers.

Examples of suitable pour point and/or floc point depressants include polymethacrylates such as methacrylate-ethylene-vinyl acetate terpolymers; alkylated naphthalene derivatives; and products of Friedel-Crafts catalyzed condensation of urea with naphthalene or phenols.

Examples of suitable detergents and/or dispersants include polybutenylsuccinic acid amides; polybutenyl phosphonic acid derivatives; long chain alkyl substituted aromatic sulfonic acids and their salts; and metal salts of alkyl sulfides, of alkyl phenols, and of condensation products of alkyl phenols and aldehydes.

Examples of suitable anti-foam agents include silicone polymers and some acrylates. Examples of suitable acid scavengers are glycidyl ethers and esters.

Examples of suitable anti-wear and extreme pressure resistance agents include sulfurized fatty acids and fatty acid esters, such as sulfurized octyl tallate; sulfurized terpenes; sulfurized olefins; organopolysulfides; organo phosphorus derivatives including amine phosphates, alkyl acid phosphates, dialkyl phosphates, aminedithiophosphates, trialkyl and triaryl phosphorothionates, trialkyl and triaryl phosphines, and dialkylphosphites, e.g., amine salts of phosphoric acid monohexyl ester, amine salts of dinonylnaphthalene sulfonate, triphenyl phosphate, trinaphthyl phosphate, diphenyl cresyl and dicresyl phenyl phosphates, naphthyl diphenyl phosphate, triphenylphosphorothionate; dithiocarbamates, such as an antimony dialkyl dithiocarbamate; chlorinated and/or fluorinated hydrocarbons; and xanthates.

The present invention will be better understood through the following examples which are merely for illustrating the present invention, not merely for limiting the scope of the present invention. In the following examples, 2-methylbutanoic acid (MBA) was used; however, MBA is able to be replaced by 3-methylbutanoic acid or a mixture of 2-methylbutanoic acid and 3-methylbutanoic acid. Accordingly, methylbutanoic acid in the claims means 2-methylbutanoic acid, 3-methylbutanoic acid or a mixture of 2-methylbutanoic acid and 3-methylbutanoic acid.

Example 1. TriPE+(iC9, MBA, nC5)

A mixed polyol ester (POE) was synthesized in this example by reacting TriPE (tripentaerythritol) and a mixture of 3,5,5-trimethyl hexanoic acid (iC9 acid), 2-methylbutanoic acid (MBA) and n-pentanoic acid (nC5 acid) with a ratio of 2:7:2 by weight.

The POE synthesis procedures described in this example were also adopted in the following examples with modifications in the reactants and the amounts thereof. TriPE, such as the one marketed by Jiangsu Ruiyang Chemical Co., Ltd. in China, and the carboxylic acids, nC5 acid, such as the one marketed by Dow Chemical; MBA, such as the one marketed by Oxea Corporation in US; and iC9 acid, such as the one marketed by KH NeoChem Co. in Japan, were placed in a one-liter flask equipped with a thermometer, a nitrogen purging tube, and a stirrer, which sit within a temperature-controlled heating mantle. An excess chemically stoichiometric amount of acids was used in the reaction; and the ratio of the hydroxyl group in the alcohol to the carboxyl group in the mixed carboxylic acid was 1:1.1 to 1.2. The reactions between the alcohol and the acids were promoted by stirring and heating under a nitrogen atmosphere at 200° C. to 230° C. During the reaction water generated was removed by distillation, and the hydroxyl value of the reaction mixture was monitored. The reaction was halted when the hydroxyl value dropped below 3 mgKOH/g by discontinuing the heating and stirring, which took about –8-12 hours. The product mixture was further purified by subjecting to water removal by vacuum, acid removal by neutralization with NaOH, and discoloration by carbon-black absorption. Afterward, nitrogen bubbling at temperatures controlled at 50° C. to 100° C. was carried out to dehydrate the purified ester. The final polyester product has a total acid number (TAN) leas than 0.1 mgKOH/g and water content less than 50 ppm.

The POE prepared in this example achieves the conflicting requirements of high viscosity as well as high miscibility with the HFC refrigerants such as R-134a (1,1,1,2-tetrafluoroethane, which will be demonstrated in the Example 4). The POE of Example 1 has the following physical properties.

|  | Test method | Typical value |
| --- | --- | --- |
| Viscosity (40° C.), cSt | ASTM D445 | 320 |
| Viscosity (100° C.), cSt | ASTM D445 | 24.8 |
| VI | ASTM D2270 | 100 |
| Pour Point, ° C. | ASTM D97 | −30 |
| Flash Point, ° C. | ASTM D92 | 304 |
| Density (15° C.) | ASTM D4052 | 1.02 |

Example 2. Blend of TriPE+(MBA, iC9) and DiPE+MBA (50/50)

The innovative POE prepared in this example has a viscosity of ISO 220 at 40° C., it is composed of polyesters from TriPE+(MBA and iC9 acid with a ratio of 30:70 by weight) and from DiPE+MBA with a weight ratio of 50:50. This mixed POE oils can be manufactured by either blending of two POEs made separately or by reacting TriPE and DiPE with MBA, and iC9 acid at controlled conditions. In this example the mixed POE oils was manufactured by blending of two POEs made separately similarly in Example 1. The mixed POE prepared in this example has the following physical properties:

|  | Test method | Typical value |
| --- | --- | --- |
| Viscosity (40° C.), cSt | ASTM D445 | 220 |
| Viscosity (100° C.), cSt | ASTM D445 | 18.6 |
| VI | ASTM D2270 | 94 |
| Pour Point, ° C. | ASTM D97 | −28 |
| Flash Point, ° C. | ASTM D92 | 282 |
| Density (15° C.) | ASTM D4052 | 1.030 |

Example 3. Blend of DiPE+MBA and TriPE+(Neo 10+MBA) (45/55)

The innovative POE prepared in this example has a viscosity of ISO 400 at 40° C., it is a blend of DiPE+MBA and TriPE+(neodecanoic acid (neo 10)+MBA with a ratio of 3:1 by weight) with a weight ratio of 45:55. In this example the mixed POE oils was manufactured by blending of two POEs made separately similarly in Example 1. Even with a profoundly high viscosity of 400 cSt at 40° C., it was found that the POE prepared in this example has a surprisingly high miscibility with HFC refrigerants such as the R-134a which will be demonstrated in the Example 4. The POE has the following physical properties:

|  | Test method | Typical value |
| --- | --- | --- |
| Viscosity (40° C.), cSt | ASTM D445 | 400 |
| Viscosity (100° C.), cSt | ASTM D445 | 26.8 |

-continued

|  | Test method | Typical value |
|---|---|---|
| VI | ASTM D2270 | 91 |
| Pour Point, ° C. | ASTM D97 | −23 |
| Flash Point, ° C. | ASTM D92 | 283 |
| Density (15° C.) | ASTM D4052 | 1.034 |

Example 4. Miscibility Comparison

The comparison of compatibility/miscibility between the lubricating oils prepared in Example 1, 2 and 3 and the conventional POE lubricating oils with the R-134a refrigerant are shown in this example. Two commonly used, commercially available POE lubricating oils—an ISO 68 and ISO 120 POE lubricating oils—were chosen for the comparison.

Phase separation temperatures measured at a low temperature was used to indicate the compatibility/miscibility. Taking the 20% oil in refrigerant concentration as an example, 0.6 g of a sample oil and 2.4 g of the refrigerant R-134a were enclosed in a thick PYREX (registered trademark) tube (entire length of 300 mm, outer diameter of 10 mm, and inner diameter of 6 mm) cooled in an ethanol bath containing dry ice and warmed. Then the two-phase separation temperatures were measured visually within a temperature range from +60° C. to −60° C. The results are shown in Table 1.

TABLE 1

Comparison of Compatibility/Miscibility between the POE lubricating oils prepared in Example 1, 2 and 3 and two conventional POE lubricating oils with R-134a

| Conc.* | RB 68** | RL 120** | Example 1 | Example 2 | Example 3 |
|---|---|---|---|---|---|
| 5% oil | −50° C. | −35° C. | <−60° C. | <−60° C. | <−60° C. |
| 10% oil | −35° C. | −27° C. | <−60° C. | <−60° C. | <−60° C. |
| 20% oil | −20° | −15 C.° | <−60° C. | <−60° C. | <−60° C. |

*% is based on the total weight of oil and R-134a refrigerant.
**Ze-GLES RB 68: JX NIPPON OIL AND ENERGY CORPORATION, Japan; CRYO-LANT RL120, Patech Fine Chemicals Co., Ltd., Taiwan Lower viscosity has the tendency (but not always) to render the POE lubricating oils more compatible/miscible with the R-134a refrigerant. However, the lubricating oils prepared in Example 1, 2 and 3 demonstrate much better miscibility/compatibility at 5%, 10% and 20% oil in refrigerant concentrations. This compatibility/miscibility would facilitate oil return from the evaporator or piping in the refrigeration, or air-conditioning systems.

Example 5. Measurements of Important Refrigeration Lubricant Properties—Water Specification, Total Acid Number (TAN) and Dielectric Strength In order to meet the requirements in closed-loop refrigeration, air-conditioning or heating systems, the compressor lubricating oils are required to meet industry recognized quality standards. The important ones among them are water specification, total acid number (TAN) and dielectric strength. The water content in the POE lubricating oil should be minimized as water can react with esters forming acids. In addition, excessive water in oil may be frozen out on metal surfaces hindering the heat transfer. Total acid number (TAN) in the POE lubricating oils should also be minimized as acids not only can cause corrosion but also can catalyze the degradation of esters. The dielectric constant is important as the POE lubricating oils are frequently in contact with electric components such as motor in the systems. A lower dielectric constant (more conductive) would increase the probability of short-circuits. In the following table (Table 2) these properties of the POEs prepared in Examples 1, 2 and 3 are shown, and it can be seen from the data in the table that POEs prepared according to the present invention meet the stringent lubricating oil requirements in refrigeration, air-conditioning and heating systems.

TABLE 2

Important refrigeration lubricant properties - water content, total acid number (TAN) and dielectric constant

|  | Water (ppm) | TAN (KOH/g) | Dielectric constant (KV) |
|---|---|---|---|
| Example 1 | <50 | <0.1 | >25 |
| Example 2 | <50 | <0.1 | >25 |
| Example 3 | <50 | <0.1 | >25 |

Example 6. Sealed Tube Stability Tests

The stability of lubricating oils in refrigeration, air-conditioning or heating systems are critical as degraded products can cause filter plugging, corrosion or wear problems. Furthermore, problems caused by the degradation of lubricating oils would be compounded in closed-loop, circulating designs. One major difference between lubricating oils used in closed-loop refrigeration, air-conditioning and heating systems and those used in engines or gear applications is that the lubricating oils used in closed-loop refrigeration, air-conditioning and heating systems operate in refrigerant environment instead of the normal atmospheric environment. Therefore, to evaluate the stability of POE lubricating oils used with, for example, R-134a, it is only meaningful that the test is conducted in the R-134a environment, thus adopting the sealed tube test.

Lubricating oil which can't satisfactorily pass the sealed tube stability test may form acids, deposits, insoluble material which may result in corrosion, valve sticking, plugged filter, plugged capillary tube or viscosity change. All of these could result in excessive energy consumption, poor system performance and/or expensive maintenance work.

The results of sealed tube tests of the lubricating oils prepared in Examples 1, 2 and 3 are shown in Table 3. The data in Table 3 show that the lubricating oils of the present invention are stable in a refrigerant environment based on an industry standard test. These results indicate the lubricating oils of the present invention will have long life and trouble-free operation when the refrigeration, air-conditioning or heating systems are assembled properly.

TABLE 3

Sealed Tube Stability Test** of the lubricating oils prepared in the Examples 1, 2 and 3 with the R-134a Refrigerant

|  |  | Example 1 | Example 2 | Example 3 |
|---|---|---|---|---|
| Initial Lubricant moisture (ppm) |  | <50 | <50 | <50 |
| Appearance |  | Clear | Clear | Clear |
| Sludge Formation |  | None | None | None |
| Acid Value | Initial | 0.01 | 0.01 | 0.01 |
| (mgKOH/g) | After | <0.1 | <0.1 | <0.1 |
| The state of | Copper | ⊚ | ⊚ | ⊚ |

TABLE 3-continued

Sealed Tube Stability Test** of the lubricating oils prepared
in the Examples 1, 2 and 3 with the R-134a Refrigerant

|  |  | Example 1 | Example 2 | Example 3 |
|---|---|---|---|---|
| metal* | Iron | ◎ | ◎ | ◎ |
|  | Aluminum | ◎ | ◎ | ◎ |

*Visual Rating:
◎: No Change;
○: Slight Color Change;
Δ: Moderate Color Change
**Test Method: Sealed Glass Tube Test (ANSI/ASHRAE Standard 97-2007)
Temperature: 175° C., Duration: 14 days, Lubricant/Refrigerant (wt/wt) = (50/50)

Example 7. Comparison of Compatibility/Miscibility Between the Lubricating Oils Prepared in Example 2 vs. Two Conventional POE Lubricating Oils with the Same Viscosity Grade in R-134a The same compatibility/miscibility test used in Example 4 was repeated for two conventional ISO 220 POE lubricating oils (RB 220 and RL 220) and the lubricating oil prepared in Example 2 separately. The results are shown in Table 4, wherein the RB 220 of the two conventional ISO 220 POE lubricating oil is mostly composed of polyesters from branched acids while the RL 220 has more linearity. The lubricating oil prepared in Example 2 also is an ISO 220 grade. The data in Table 4 clearly show the distinction on miscibility between the two conventional ISO 220 POE lubricating oils vs. the lubricating oil prepared in Example 2. The surprisingly highly miscible characteristic of the lubricating oil prepared in Example 2 would result in cleaner meal surfaces in a closed-loop system, and thus would less an impedance to heat transfer in comparison with the conventional POE refrigeration lubricating oils.

TABLE 4

Comparison of Compatibility/Miscibility between the lubricating
oils of Example 2 vs. two conventional POE lubricating
oils with the same viscosity grade in R-134a

| Conc. * | RB 220** | RL 220** | Example 2 |
|---|---|---|---|
| 5% oil | −35° C. | −45° C. | <−60° C. |
| 10% oil | −23° C. | −35° C. | <−60° C. |
| 20% oil | −8° C. | −31° C. | <−60° C. |

* % is based on the total weight of oil and R-134a refrigerant.
**CRYOLANT RLRB220, RL120: Patech Fine Chemicals Co., Ltd., Taiwan

Example 8. Hydrolytic Stability Tests (ASTM 2619)

Although closed-looped refrigeration, air-conditioning and heating systems are supposed to be assemble with great care to minimize contamination and water intake. Furthermore, these systems typically employ filter/dryer to absorb water as additional safety designs. However, due to the exceptionally large number of systems in use or will be set up, and inconsistence among contractors and trade skills, it is difficult to ask for perfection in every case. As a result, water may inevitably find its way into some of these closed-loop systems. Consequently lubricating oils with high levels of resistance to hydrolysis are always preferred. A commonly used hydrolytic stability test is the ASTM 2619, in which water and oil are placed together under mechanical mixing at an elevated temperature for an extended period of time. Hydrolytic unstable lubricating oils may form acids, insoluble or suffer loss of viscosity. The test results for the lubricating oils prepared in Examples 1, 2 and 3 are shown in Table 5.

TABLE 5

Hydrolytic stability test of the lubricating
oils in the Examples 1, 2 and 3

|  |  | Example 1 | Example 2 | Example 3 |
|---|---|---|---|---|
| Appearance |  | Clear | Clear | Clear |
| Sludge Formation |  | None | None | None |
| Acid Value | Initial | 0.01 | 0.01 | 0.01 |
| (mgKOH/g) | After | <0.1 | <0.1 | <0.1 |

Test Method: ASTM 2619

It can clearly seen form Table 5 that the POE lubricating oils prepared in Examples 1, 2 and 3 have sufficient hydrolytic stability to perform well in the ASTM 2619 test. These results provide additional assurance when the POE lubricating oil of the present invention is used in a large scale.

Example 9. DiPE+(iC9, MBA)

A mixed polyol ester (POE) was synthesized in this example by reacting DiPE (Dipentaerythritol) and a mixture of 3,5,5-trimethyl hexanoic acid (iC9 acid) and 2-methylbutanoic acid (MBA) with a ratio of 1:1 by weight.

Similar synthesis procedures as described in Example 1 were adopted in this example with the necessary changes in the reactants and the amounts thereof. DiPE, MBA and iC9 acid were placed in a one-liter flask equipped with a thermometer, a nitrogen purging tube, and a stirrer, which sit within a temperature-controlled heating mantle to start the synthesis reactions. Similarly; in the end, the product mixture was purified by subjecting to water removal by vacuum, acid removal by neutralization with NaOH, and discoloration by carbon-black absorption. Afterward, nitrogen bubbling at temperatures controlled at 50° C. to 100° C. was carried out to dehydrate the purified ester. The final polyester product has a total acid number (TAN) leas than 0.1 mgKOH/g and water content less than 50 ppm.

The POE prepared in this example achieves the conflicting requirements of high viscosity as well as high miscibility with the HFC refrigerants such as R-134a. The POE obtained in this example has the following physical properties.

|  | Test method | Typical value |
|---|---|---|
| Viscosity (40° C.), cSt | ASTM D445 | 220 |
| Viscosity (100° C.), cSt | ASTM D445 | 18.3 |
| VI | ASTM D2270 | 91 |
| Pour Point, ° C. | ASTM D97 | −29 |
| Flash Point, ° C. | ASTM D92 | 282 |
| Density (15° C.) | ASTM D4052 | 1.0005 |

The miscibility of the POE prepared in this example in the HFC refrigerant such as R-134a is shown as follows:

| Conc. * | Example 9 |
|---|---|
| 5% oil | <−60° C. |
| 10% oil | <−60° C. |
| 20% oil | <−60° C. |

* % is based on the total weight of oil and R-134a refrigerant.

The invention claimed is:

1. A method of lubricating a rotary screw compressor in which a chlorine-free hydrofluorocarbon refrigerant is compressed, which comprises mixing a lubricant composition with said chlorine-free hydrofluorocarbon refrigerant, wherein said lubricant composition consists of a first polyester having a formula of (I) or consisting of the first polyester having a formula of (I) and a second polyester having a formula of (II):

$$(R^1CH_2)(R^2CH_2)C[CH_2-O-CH_2-C(CH_2R^3)(CH_2R^4)(CH_2R^5)]_2 \quad (I)$$

$$O-[CH_2-C(CH_2R^6)(CH_2R^7)(CH_2R^8)]_2 \quad (II)$$

wherein each of $R^1$ to $R^8$ is a carboxylate of a C5-C10 monocarboxylic acid, the first and the second polyester each has two or more different carboxylates of the C5-C10 monocarboxylic acids, and said lubricant composition has a viscosity of 160-460 centistokes at 40° C.

2. The method of claim 1, wherein said lubricant composition consists of the first polyester having the formula (I), and the C5-C10 monocarboxylic acid comprises C5 carboxylic acid, and C9 carboxylic acid or C10 carboxylic acid, wherein the carboxylates of $R^1$ to $R^5$ have a ratio between weight of the C5 carboxylic acid and a total weight of the C9 carboxylic acid and C10 carboxylic acid being 6:1 to 1:4.

3. The method of claim 2, wherein the C5 carboxylic acid comprises n-pentanoic acid or methylbutanoic acid, the C9 carboxylic acid comprises 3,5,5-trimethyl hexanoic acid, and the C10 carboxylic acid comprises neodecanoic acid.

4. The method of claim 3, wherein the first polyester has a weight ratio of the carboxylates of n-pentanoic acid, methylbutanoic acid and 3,5,5-trimethyl hexanoic acid being about 1-3:6-8:2.

5. The method of claim 4, wherein the weight ratio of the carboxylates of n-pentanoic acid, methylbutanoic acid and 3,5,5-trimethyl hexanoic acid is about 2:7:2.

6. The method of claim 4, wherein the first polyester is a product mixture obtained from a reaction of tripentaerythritol and a mixed carboxylic acid of n-pentanoic acid, methylbutanoic acid and 3,5,5-trimethyl hexanoic acid, or reactions of tripentaerythritol and one, two or three carboxylic acids selected from n-pentanoic acid, methylbutanoic acid and 3,5,5-trimethyl hexanoic acid, with a molar ratio of hydroxyl group to carboxyl group of about 1.0:1.02-1.2.

7. The method of claim 6, wherein the first polyester is a product mixture obtained from a reaction of tripentaerythritol and a mixed carboxylic acid of n-pentanoic acid, methylbutanoic acid and 3,5,5-trimethyl hexanoic acid.

8. The method of claim 1, wherein said lubricant composition consists of the first polyester having the formula (I) and the second polyester having the formula (II), wherein each of $R^6$ to $R^8$ is a carboxylate of a C5 monocarboxylic acid, and a weight ratio between the first polyester having the formula (I) and the second polyester having the formula (II) is 7:3 to 1:2.

9. The method of claim 8, wherein $R^6$, $R^7$ and $R^8$ are carboxylates of methylbutanoic acid.

10. The method of claim 9, wherein the C5-C10 monocarboxylic acid comprises C5 carboxylic acid, and C9 carboxylic acid or C10 carboxylic acid, wherein the carboxylates of $R^1$ to $R^5$ have a ratio between weight of the C5 carboxylic acid and a total weight of the C9 carboxylic acid and C10 carboxylic acid being 6:1 to 1:4.

11. The method of claim 9, wherein the C5-C10 monocarboxylic acid comprises methylbutanoic acid and 3,5,5-trimethyl hexanoic acid, wherein a ratio between weight of 3-methylbutanoic acid and weight of 3,5,5-trimethyl hexanoic acid is about 3:7.

12. The method of claim 9, wherein the C5-C10 monocarboxylic acid comprises methylbutanoic acid and neodecanoic acid, wherein a ratio between weight of methylbutanoic acid and weight of neodecanoic acid is about 1:3.

13. The method of claim 11, wherein the weight ratio between the first polyester having the formula (I) and the second polyester having the formula (II) is about 1:1.

14. The method of claim 12, wherein the weight ratio between the first polyester having the formula (I) and the second polyester having the formula (II) is about 55:45.

15. The method of claim 1, wherein said lubricant composition has a viscosity of 220-360 centistokes at 40° C.

16. The method of claim 1, wherein said lubricant composition has a miscibility with the chlorine-free hydrofluorocarbon refrigerant lower than −35° C. at 5 wt %, 10 wt % and 20 wt % said lubricant composition in said chlorine-free hydrofluorocarbon refrigerant, based on total weight of said lubricant composition and said chlorine-free hydrofluorocarbon refrigerant, when said chlorine-free hydrofluorocarbon refrigerant is R-134a.

17. The method of claim 16, wherein said miscibility is lower than −45° C.

18. The method of claim 17, wherein said miscibility is lower than −60° C.

19. The method of claim 1, wherein the chlorine-free hydrofluorocarbon refrigerant is R-134a, R-32, R-125 or a mixture thereof.

* * * * *